(12) United States Patent
Carlsson et al.

(10) Patent No.: US 12,472,085 B2
(45) Date of Patent: Nov. 18, 2025

(54) DOUBLE-SIDED SENSOR DEVICE FOR OSTOMY LEAK DETECTION SYSTEM

(71) Applicant: Hollister Incorporated, Libertyville, IL (US)

(72) Inventors: Jonas P. Carlsson, Chicago, IL (US); Lauren M. Lattanzi, Raleigh, NC (US); Kyle A. Matthews, Chapel Hill, NC (US)

(73) Assignee: HOLLISTER INCORPORATED, Libertyville, IL (US)

( * ) Notice: Subject to any disclaimer, the term of this patent is extended or adjusted under 35 U.S.C. 154(b) by 468 days.

(21) Appl. No.: 18/014,687

(22) PCT Filed: Jul. 22, 2021

(86) PCT No.: PCT/US2021/070932
§ 371 (c)(1),
(2) Date: Jan. 5, 2023

(87) PCT Pub. No.: WO2022/020853
PCT Pub. Date: Jan. 27, 2022

(65) Prior Publication Data
US 2023/0218423 A1    Jul. 13, 2023

Related U.S. Application Data

(60) Provisional application No. 63/056,289, filed on Jul. 24, 2020.

(51) Int. Cl.
*A61F 5/44* (2006.01)
*A61F 5/445* (2006.01)

(52) U.S. Cl.
CPC ............ *A61F 5/4404* (2013.01); *A61F 5/445* (2013.01)

(58) Field of Classification Search
CPC .............................. A61F 5/4404; A61F 5/445
See application file for complete search history.

(56) References Cited

U.S. PATENT DOCUMENTS 6,365,974 B1    4/2002    Abbott et al.
6,915,566 B2    7/2005    Abbott et al.
(Continued)

FOREIGN PATENT DOCUMENTS

WO    2019/094635 A1    5/2019
WO    2019/120425 A1    6/2019
(Continued)

OTHER PUBLICATIONS

International Search Report issued by ISA/EPO on Jan. 27, 2022 in connection with PCT/US2021/070932.
(Continued)

*Primary Examiner* — Guy K Townsend
(74) *Attorney, Agent, or Firm* — Klintworth & Rozenblat LLP (57) ABSTRACT

A sensor device for detecting ostomy effluent leakage in an ostomy appliance includes a sensor layer and a skin barrier layer for attaching the sensor device to a user. The sensor layer includes a substrate, a plurality of sensing electrodes arranged on a proximal side of the substrate, a plurality of connecting traces arranged on a distal side of the substrate, and a plurality of connection points configured to electrically connect the sensor device to a control unit.

18 Claims, 4 Drawing Sheets

(56) References Cited

U.S. PATENT DOCUMENTS

| | | | |
|---|---|---|---|
| 8,456,851 B2 | 6/2013 | Grunthaner | |
| 10,310,294 B2 | 6/2019 | Pugh et al. | |
| 10,603,224 B2 | 3/2020 | Prokopuk et al. | |
| 10,653,480 B2 | 5/2020 | Beeckler et al. | |
| 11,534,323 B2* | 12/2022 | Hansen | A61F 2/64 |
| 11,805,970 B2 | 11/2023 | Faarbaek et al. | |
| 12,161,578 B2* | 12/2024 | Carlsson | G01M 3/16 |
| 2010/0030167 A1* | 2/2010 | Thirstrup | A61F 5/4404 340/657 |
| 2017/0140103 A1 | 5/2017 | Angelides | |
| 2019/0133812 A1* | 5/2019 | Seres | A61F 5/443 |
| 2019/0142623 A1 | 5/2019 | Norman et al. | |
| 2019/0240059 A1 | 8/2019 | Michael et al. | |
| 2020/0000624 A1* | 1/2020 | Gibbons | A61B 5/444 |
| 2020/0246174 A1* | 8/2020 | Hansen | A61F 5/443 |
| 2020/0246175 A1 | 8/2020 | Ask et al. | |
| 2020/0246176 A1* | 8/2020 | Hansen | A61F 5/445 |
| 2020/0246177 A1 | 8/2020 | Ask et al. | |
| 2020/0375784 A1* | 12/2020 | Hansen | A61F 5/443 |
| 2020/0375785 A1* | 12/2020 | Hansen | G16H 30/40 |
| 2020/0390587 A1* | 12/2020 | Svanegaard | G16H 40/40 |
| 2020/0395120 A1* | 12/2020 | Svanegaard | A61F 5/4404 |
| 2020/0405230 A1* | 12/2020 | Svanegaard | A61B 5/6813 |
| 2021/0000414 A1* | 1/2021 | Svanegaard | A61F 5/4404 |
| 2021/0007663 A1* | 1/2021 | Svanegaard | G16H 40/40 |
| 2021/0007881 A1* | 1/2021 | Svanegaard | A61B 5/002 |
| 2021/0059603 A1* | 3/2021 | Svanegaard | A61F 5/443 |
| 2021/0275341 A1 | 9/2021 | Kristoffer | |
| 2021/0353448 A1 | 11/2021 | George et al. | |
| 2021/0369491 A1 | 12/2021 | Holden | |
| 2021/0386368 A1 | 12/2021 | Carlsson et al. | |
| 2022/0117771 A1 | 4/2022 | Fearn et al. | |
| 2022/0257405 A1 | 8/2022 | Peder et al. | |
| 2022/0265457 A1* | 8/2022 | Emborg | A61F 5/4404 |
| 2022/0304844 A1* | 9/2022 | Carlsson | A61F 5/443 |
| 2022/0313473 A1* | 10/2022 | Schertiger | A61F 5/445 |
| 2022/0378602 A1* | 12/2022 | Hansen | A61F 5/4404 |
| 2023/0030622 A1* | 2/2023 | Nielsen | A61F 5/443 |
| 2023/0031979 A1* | 2/2023 | Windeballe | A61F 5/443 |

FOREIGN PATENT DOCUMENTS

| | | |
|---|---|---|
| WO | 2019/120426 A1 | 6/2019 |
| WO | 2019/120427 A1 | 6/2019 |
| WO | 2019/120428 A1 | 6/2019 |
| WO | 2019/120429 A1 | 6/2019 |
| WO | 2019/120430 A1 | 6/2019 |
| WO | 2019/120432 A1 | 6/2019 |
| WO | 2019/120433 A1 | 6/2019 |
| WO | 2019/120434 A1 | 6/2019 |
| WO | 2019/120435 A1 | 6/2019 |
| WO | 2019/120436 A1 | 6/2019 |
| WO | 2019/120437 A1 | 6/2019 |
| WO | 2019/120440 A1 | 6/2019 |
| WO | 2019/120441 A1 | 6/2019 |
| WO | 2019/120442 A1 | 6/2019 |
| WO | 2019/120443 A1 | 6/2019 |
| WO | 2019/120444 A1 | 6/2019 |
| WO | 2019/120445 A1 | 6/2019 |
| WO | 2019/120448 A1 | 6/2019 |
| WO | 2019/120449 A1 | 6/2019 |
| WO | 2019/120450 A1 | 6/2019 |
| WO | 2019/120451 A1 | 6/2019 |
| WO | 2019/120452 A1 | 6/2019 |
| WO | 2019/120453 A1 | 6/2019 |
| WO | 2019/120458 A1 | 6/2019 |
| WO | WO-2019120424 A1 * | 6/2019 ............... A61F 5/44 |
| WO | WO-2019120446 A1 * | 6/2019 ............. A61F 5/443 |
| WO | 2019/149330 A1 | 8/2019 |
| WO | 2019/161859 A1 | 8/2019 |
| WO | 2019/161860 A1 | 8/2019 |
| WO | 2019/161861 A1 | 8/2019 |
| WO | 2019/161862 A1 | 8/2019 |
| WO | 2019/161863 A1 | 8/2019 |
| WO | 2019/174687 A1 | 9/2019 |
| WO | 2019/174692 A1 | 9/2019 |
| WO | 2019/174693 A1 | 9/2019 |
| WO | 2019/174694 A1 | 9/2019 |
| WO | 2019/174695 A1 | 9/2019 |
| WO | 2019/174696 A1 | 9/2019 |
| WO | 2019/174697 A1 | 9/2019 |
| WO | 2019/174698 A1 | 9/2019 |
| WO | 2019/174699 A1 | 9/2019 |
| WO | 2019/238180 A1 | 12/2019 |
| WO | 2019/238181 A1 | 12/2019 |
| WO | 2019/238182 A1 | 12/2019 |
| WO | 2019/238183 A1 | 12/2019 |
| WO | 2020/035121 A1 | 2/2020 |
| WO | 2020/123771 A2 | 6/2020 |
| WO | 2020/156624 A1 | 8/2020 |
| WO | 2020/156625 A1 | 8/2020 |
| WO | 2020/156626 A1 | 8/2020 |
| WO | 2020/169162 A1 | 8/2020 |
| WO | 2020/173534 A1 | 9/2020 |
| WO | 2020/216426 A1 | 10/2020 |
| WO | 2020/216427 A1 | 10/2020 |
| WO | 2020/216429 A1 | 10/2020 |
| WO | 2020/259775 A1 | 12/2020 |
| WO | 2021/063463 A1 | 4/2021 |
| WO | 2021/063466 A1 | 4/2021 |
| WO | 2021/165703 A1 | 8/2021 |
| WO | 2021/165705 A1 | 8/2021 |
| WO | 2021/185425 A1 | 9/2021 |
| WO | 2021/209104 A1 | 10/2021 |
| WO | 2022/063379 A1 | 3/2022 |
| WO | 2022/078561 A1 | 4/2022 |
| WO | 2022/207049 A1 | 10/2022 |

OTHER PUBLICATIONS

Written Opinion issued by ISA/EPO on Jan. 27, 2022 in connection with PCT/US2021/070932.
International Preliminary Report on Patentability issued by WIPO on Feb. 2, 2023 in connection with PCT/US2021/070932.

* cited by examiner

DOUBLE-SIDED SENSOR DEVICE FOR OSTOMY LEAK DETECTION SYSTEM

This is a National Stage Application of International Patent Application No. PCT/US2021/070932 filed Jul. 22, 2021, which claims the benefit of and priority to U.S. Provisional Application No. 63/056,289 filed Jul. 24, 2020, the entirety of which are incorporated fully herein by reference.

BACKGROUND

The following description relates generally to a leakage detection system for medical devices, and more particularly to a sensor device for detecting leakage in ostomy appliances.

An ostomy pouch system typically includes a pouch formed from opposing sidewalls defining an internal collection area, an inlet opening for receiving a stoma, and an ostomy appliance for attaching the pouch to a user. The ostomy appliance may include, for example, an ostomy barrier of a one-piece pouch system, which is attached to one of the pouch sidewalls proximate an inlet opening, a faceplate for a two-piece pouch system configured to releasably engage a pouch, and a barrier ring. The ostomy appliance may include a skin barrier material for adhering to and sealing against user's peristomal skin surrounding the stoma.

The ostomy appliance may be susceptible to ostomy effluent leakage, and the seal formed between the skin barrier material and the user may weaken. Often times, the user may be unaware of or cannot easily assess an extent of weakening in the seal. Thus, the user may not become aware of a weakened seal, and consequently, the ostomy effluent may leak through to an exterior of the ostomy appliance.

Accordingly, it is desirable to provide a leakage detection system for ostomy appliances.

SUMMARY

In one aspect, a sensor device for detecting ostomy effluent leakage in an ostomy appliance is provided. The sensor device may be provided as an accessory that can be used with an ostomy barrier or a faceplate. The sensor device may include a sensor layer and a skin barrier layer for attaching the sensor device to a user. The sensor layer may include a substrate, a plurality of sensing electrodes arranged on a proximal side of the substrate, a plurality of connecting traces arranged on a distal side of the substrate, and a plurality of connection points configured to electrically connect the sensor device to a separate control unit, such as a wearable device. The skin barrier layer may be arranged adjacent the plurality of sensing electrodes. The plurality of connecting traces may be electrically insulated from the skin barrier layer by the substrate.

In an embodiment, the sensor layer may include a generally ring-shaped sensor region, a connector region, and a tail region connecting the sensor region and the connector region. The plurality of the sensing electrodes may be arranged in the sensor region and the plurality of the connection points may be arranged in the connector region. Each of the sensing electrodes may be electrically connected to at least one of the connection points by at least one of the connecting traces.

In some embodiments, each of the sensing electrodes may be electrically connected to at least one of the connecting traces through a via. The plurality of connection points may be arranged on the proximal side of the substrate, wherein each of the connecting traces may be electrically connected to at least one of the connection points through a via. The vias may be formed from a suitable electrically conductive material and may extend through the thickness of the substrate.

The plurality of sensing electrodes may comprise a first sensing electrode, a second sensing electrode, and a third sensing electrode. The plurality of the connecting traces may comprise a first connecting trace, a second connecting trace, and a third connecting trace. Further, the plurality of connection points may comprise a first connection point, a second connection point, and a third connection point.

In an embodiment, the first sensing electrode may be electrically connected to the first connecting trace through a first via. The second sensing electrode may be electrically connected to the second connecting trace through a second via. The third sensing electrode may be electrically connected to the third connecting trace through a third via. In such an embodiment, the first connecting trace may be electrically connected to the first connection point through a fourth via. The second connecting trace may be electrically connected to the second connection point through a fifth via. The third connecting trace may be electrically connected to the third connection point through a sixth via.

In another embodiment, the first sensing electrode may be electrically connected to the first connecting trace through a first via. The second sensing electrode may be electrically connected to the second connecting trace through a second via, and the third sensing electrode may be electrically connected to the second connecting trace through a third via. In such an embodiment, the first connecting trace may be electrically connected to the first connection point through a fourth via, and the second connecting trace may be electrically connected to the second connection point through a fifth via.

In an embodiment, the first, second, and third sensing electrodes may be substantially circular electrodes, wherein each of the first, second, and third sensing electrodes may be arranged at a different radial distance from a center opening of the sensor device. The first, second, and third sensing electrodes may be configured to determine a radial distance of an ostomy effluent leakage location.

In another embodiment, the first, second, and third sensing electrodes may be arc shaped electrodes, wherein each of the first, second, and third sensing electrodes may be arranged in a different section of the sensor region. The first, second, and third sensing electrodes may be configured to determine a location of an ostomy effluent leakage.

In an embodiment, the plurality of sensing electrodes may further comprise a fourth sensing electrode having an arc shape, and the plurality of connecting traces may further include a fourth connecting trace. The first sensing electrode may be arranged in a first quadrant of the sensor region, the second sensing electrode may be arranged in a second quadrant of the sensor region, the third sensing electrode may be arranged in a third quadrant of the sensor region, and the fourth sensing electrode may be arranged in a fourth quadrant of the sensor region. The sensor device may be configured to determine a location of an ostomy effluent leakage based on the location of the sensing electrode that detected a change in an electrical resistance.

In such an embodiment, the first sensing electrode arranged on the proximal side of the substrate in the first quadrant may be electrically connected to the first connecting trace through a first via, wherein the first connecting trace may extend along the fourth quadrant of the sensor region and along the tail region on the distal side of the substrate. The second sensing electrode arranged on the proximal side of the substrate in the second quadrant may be electrically connected to the second connecting trace through a second via, wherein the second connecting trace may extend along the third quadrant of the sensor region and along the tail region on the distal side of the substrate. The third sensing electrode arranged on the proximal side of the substrate in the third quadrant may be electrically connected to the third connecting trace through a third via, wherein the third connecting trace may extend from a lower portion of the sensor region and along the tail region on the distal side of the substrate. Further, the fourth sensing electrode arranged on the proximal side of the substrate in the fourth quadrant may be electrically connected to the fourth connecting trace through a fourth via, wherein the fourth connecting trace may extend from a lower portion of the sensor region and along the tail region on the distal side of the substrate.

The plurality of connection points may be arranged on the proximal side of the substrate and further comprise a fourth connection point. In such an embodiment, the first connecting trace may be electrically connected to the first connection point via a fifth via. The second connecting trace may be electrically connected to the second connection point via a sixth via. The third connecting trace may be electrically connected to the third connection point via a seventh via, and the fourth connecting trace may be electrically connected to the fourth connection point via an eighth via.

In any of the foregoing embodiments, the sensor device may be configured to detect an ostomy effluent leakage based a change in electrical resistance measured by the plurality of sensing electrodes.

In an embodiment, the control unit may comprise a plurality of electrical connectors configured to interface with the plurality of connection points to electrically connect the control unit to the sensor device. The control unit may be configured to provide an electrical current to at least one of the sensing electrodes and detect a change in electrical resistance measured by the sensing electrodes. In some embodiments, the control unit may be configured as a wearable device that can removably connect to the sensor device.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 1:
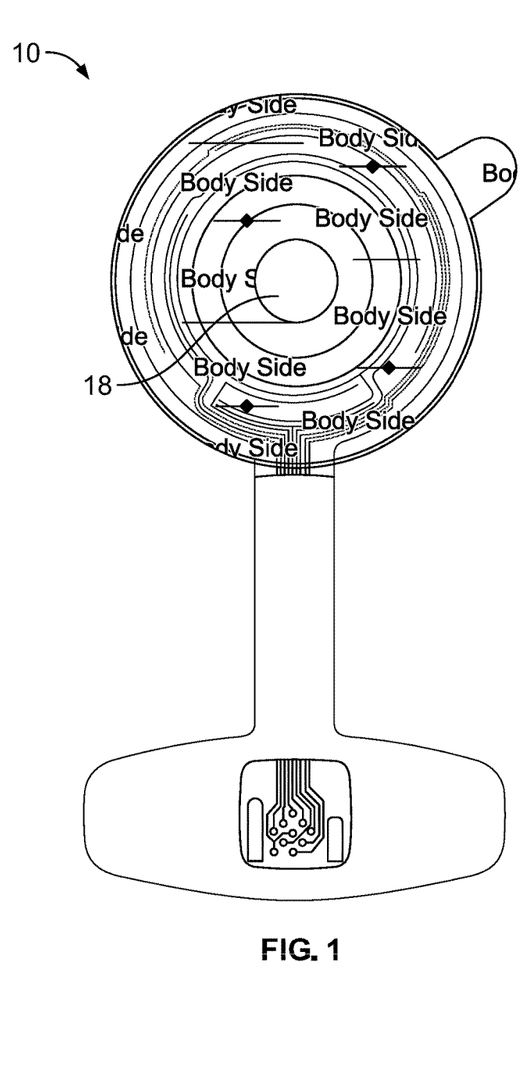
FIG. 1 is a plan view illustrating a body-side of a sensor device according to an embodiment.
Figure 2:
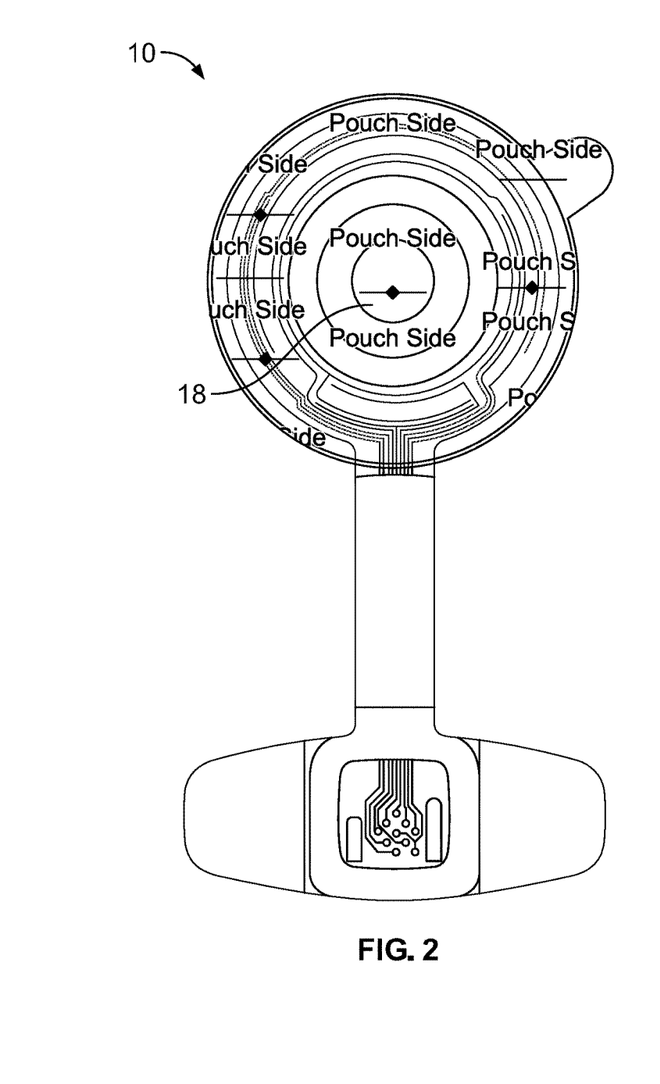
FIG. 2 is a plan view illustrating a pouch-side of the sensor device of FIG. 1.
Figure 3:
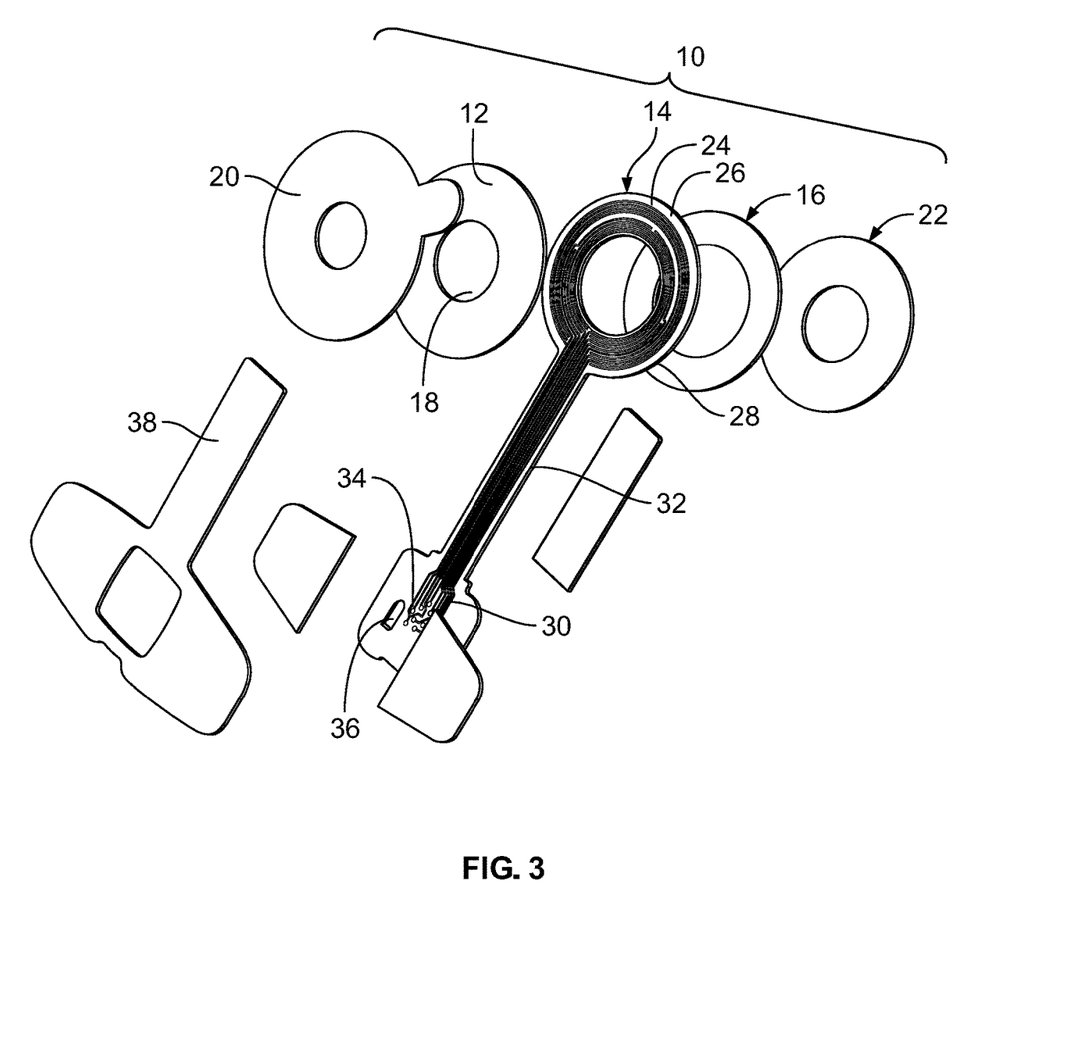
FIG. 3 is an exploded view of the sensor device of FIG. 1.

Referring to FIGS. 1-3, a sensor device 10 for an ostomy appliance according to an embodiment is illustrated. The sensor device 10 may be provided as an ostomy accessory, which may be attached to an ostomy barrier or a faceplate configured to secure an ostomy pouch to a user. FIGS. 1 and 2 show a body-side view and a pouch-side view of the sensor device 10. As best shown in FIG. 3, the sensor device 10 may include an adhesive layer 12, a sensor layer 14 and a barrier-side layer 16. A center opening 18 configured to receive a stoma may extend through the sensor device 10. The center opening 18 may be formed by respective openings extending through individual layers of the sensor device 10. Each layer 12, 14, 16 of the sensor device 10 may have a proximal side and a distal side. When the sensor device 10 is attached to a patient, the respective proximal sides generally face toward the patient and the respective distal sides generally face away from the patient.

The adhesive layer 12 may be disposed on the body-side of the sensor device 10. In an embodiment, the proximal side of the adhesive layer 12 may form at least a portion of the body-side of the sensor device 10. The proximal side of the adhesive layer 12 may be configured to adhere to peristomal skin surfaces of the patient and seal around the stoma. The adhesive layer 12 may be formed from a medical-grade pressure sensitive adhesive that can adhesively secure the sensor device 10 to a patient's peristomal skin surfaces. For example, the adhesive layer 12 may be formed from a hydrocolloid adhesive. A release liner 20 may be provided on the proximal side of the adhesive layer 12 to cover the adhesive, which may be removed by a user before attaching the sensor device 10 to user's skin.

The barrier-side layer 16 may be formed from a soft, flexible material that is generally soft and non-irritable to the user's skin, such as an adhesive, polymeric film, nonwoven or foam material. In an embodiment, the barrier-side layer 16 may be formed from an adhesive, such as a hydrocolloid adhesive. In such an embodiment, a release liner 22 may be provided on the distal side of the barrier-side layer 16 to cover the adhesive, which may be removed by a user before applying the sensor device 10 to an ostomy barrier or faceplate.

The sensor layer 14 may include an electrically conductive circuitry 24, such as a plurality of electrodes, conductive traces or the like. The electrically conductive circuitry 24 may be disposed on a substrate 26. In an embodiment, the sensor layer 14 may include a sensor region 28, a connector region 30 and a tail region 32 connecting the sensor region 28 and the connector region 30. The electrically conductive circuitry 24 may be arranged in a predetermined pattern at the sensor region 28. For example, the electrically conductive circuitry 24 may be arranged generally in a circular or semi-circular pattern. Other suitable patterns are envisioned as well, such as an oval or oblong pattern, or other closed or substantially closed loop pattern. The electrically conductive circuitry 24 at the sensor region 28 may be arranged at one or more radial distances from the center opening 18. For example, the electrically conductive circuit 24 may be arranged at a plurality of different, radial distances from the center opening 18.

In an embodiment, the tail region 32 may generally be formed as an elongated section extending from the sensor region 28. The tail region 32 may extend beyond an outer periphery of the first adhesive layer 12 and/or the barrier-side layer 16 in a direction radially outward from the center opening 18. The electrically conductive circuitry 24 may extend along the tail region 32. In an embodiment, the tail region 32 may be flexible along at least a portion of its length such that it may be folded or wrapped.

Figure 6:
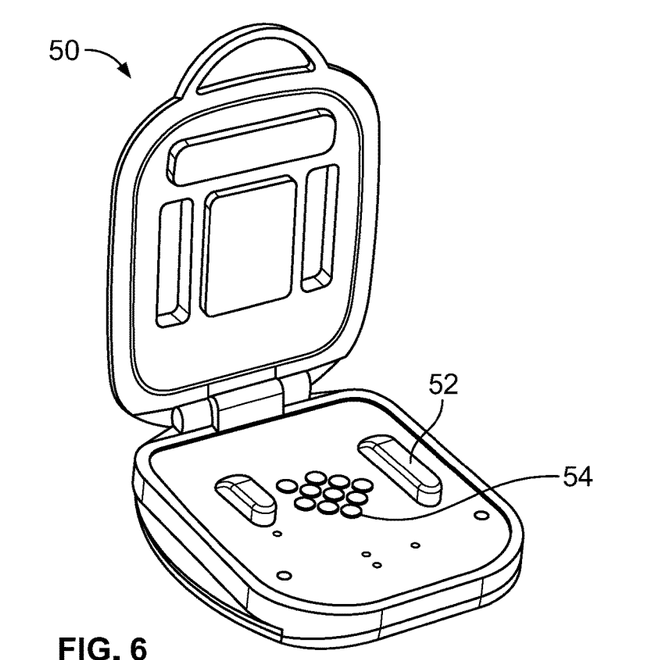
FIG. 6 is an illustration of a control unit according to an embodiment.
Figure 7:
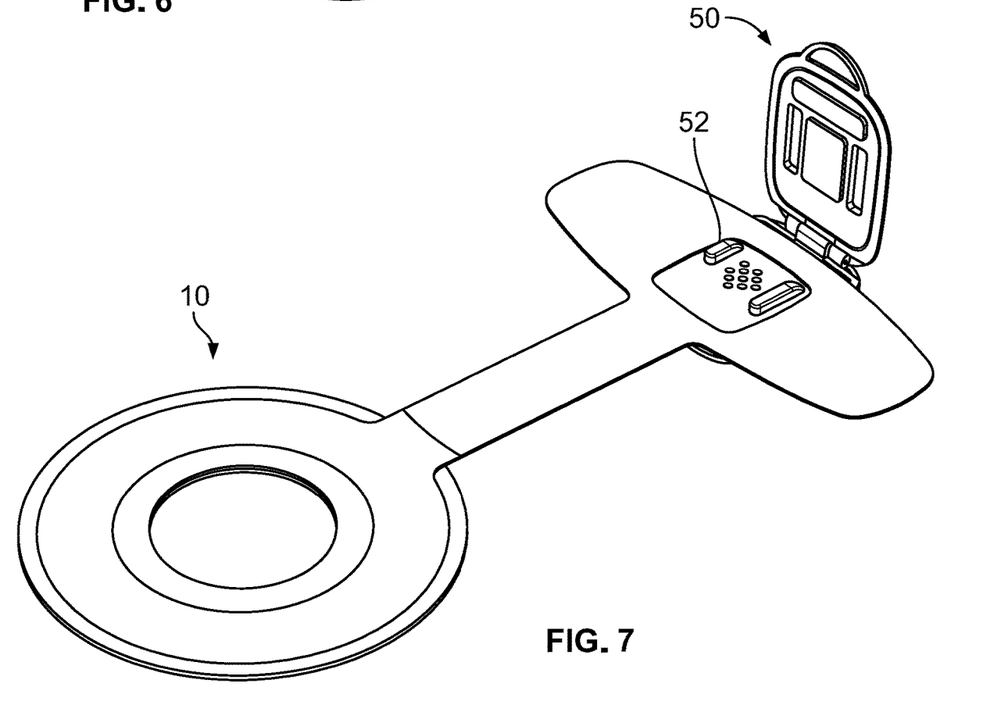
FIG. 7 is an illustration of the control unit of FIG. 6 connected to the sensor device of FIG. 1.

The connector region 30 may include a plurality of connection points 34 electrically connected to the electrically conductive circuitry 24. The connection points 34 may include an externally accessible portion configured for electrical connection to an external device, such as a control unit 50 (FIGS. 6 and 7). The control unit 50 may be, for example, a wearable device. In this manner, the connection points 34 may provide an electrical connection between the control unit 50 and the electrically conductive circuitry 24. The externally accessible portion of the connection points 34 may be any suitable electrical interface for forming an electrical connection between two electrical components, such as one or more electrically conductive contacts, pins, and the like.

The connector region 30 may also include one or more alignment members 36. The one or more alignment members 36 may be configured to engage corresponding alignment members 52 of the control unit 50 to facilitate positioning of the connector region 30 relative to the control unit 50 to provide the electrical connection as shown in FIG. 7. In an embodiment, the one or more alignment members 36 of the connector region 30 may be an opening, recess or slot. The corresponding alignment members 52 of the control unit 50 may be one or more projections configured for receipt in the opening, recess or slot of the connector region 30.

In an embodiment, the sensor device 10 may be configured to detect a leakage by measuring resistance between electrodes. For example, the sensor device 10 may be configured to detect a change in resistance between electrodes triggered by ostomy effluent bridging the electrodes as a leakage propagates. In the embodiment of FIG. 3, the electrically conductive circuitry 24 may comprise a plurality of electrodes arranged on the proximal side of the sensor region 28, such that the electrodes may be positioned adjacent and in contact with the adhesive layer 12 to measure resistance of the adhesive layer 12. The plurality of electrodes 24 may extend along the proximal side of the tail region 32 and along a portion of the connector region 30 to the connection points 34. In such an embodiment, a masking element may be used to prevent shorting between electrodes in the areas where detection is not desired. For example, a masking element 38 may be provided on the body-side of the sensor device 10 to cover the plurality of electrodes 24 in the tail region 32 and the connector region 30.

Figure 4:
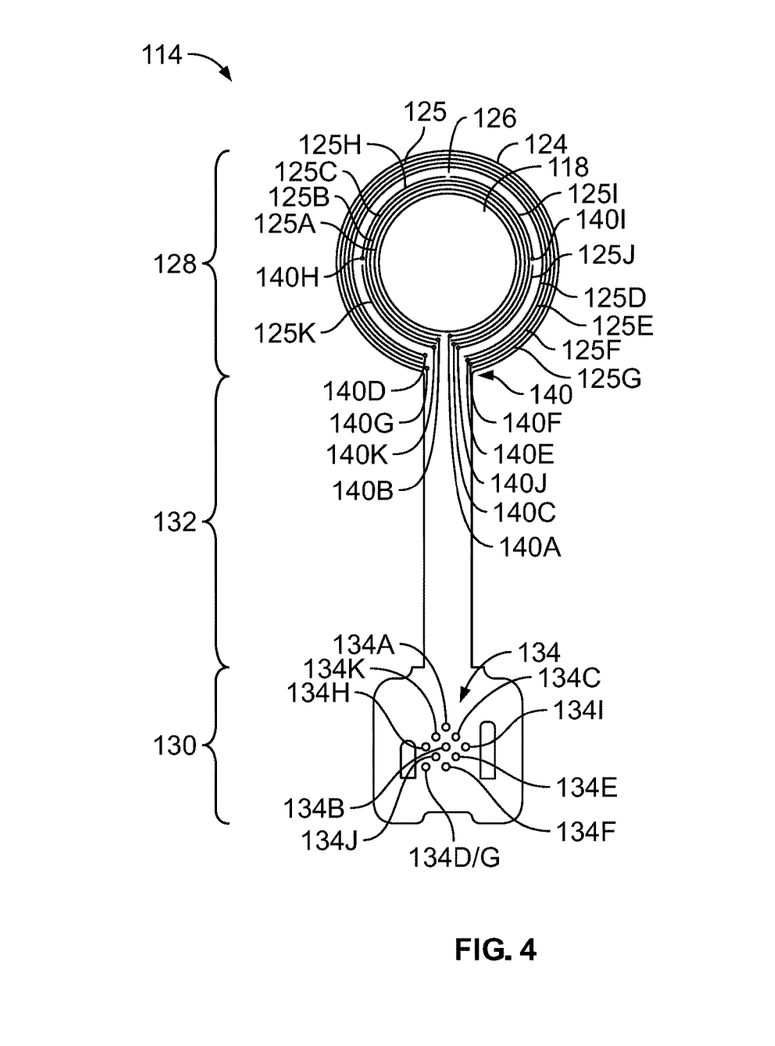
FIG. 4 is a schematic illustration of a proximal side view of a double-sided sensor layer according to an embodiment.
Figure 5:
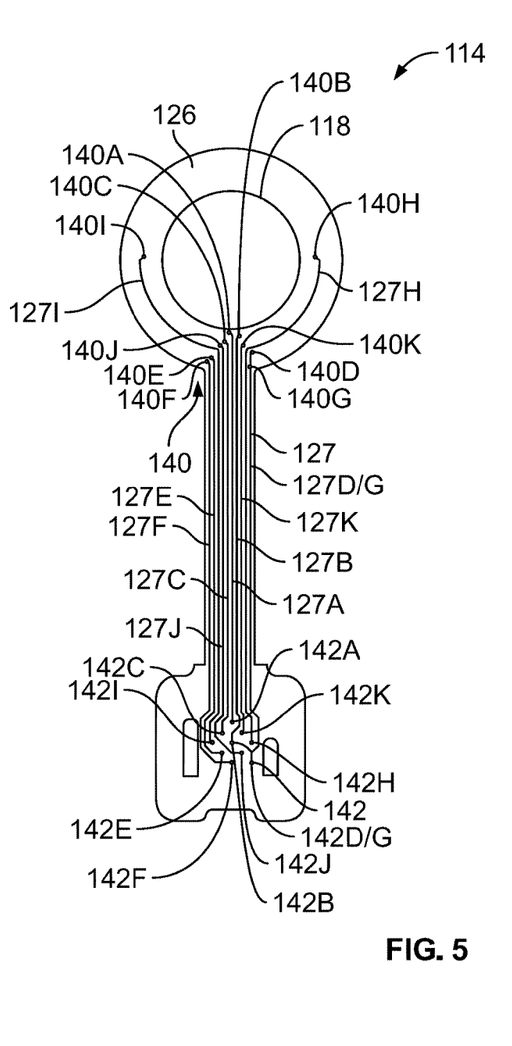
FIG. 5 is a schematic illustration of a distal side view of the double-sided sensor layer of FIG. 4.

In an embodiment, the sensor layer may be configured as a double-sided sensor layer, wherein at least a portions of the conductive circuitry may be arranged on the proximal side of the sensor layer while another portion of the conductive circuitry is arranged on the distal side the sensor layer. FIGS. 4 and 5 show a proximal side view and a distal side view of a double-sided sensor layer 114 according to an embodiment. The double-sided sensor layer 114 may be configured similar to the sensor layer 14 generally comprising a generally ring-shaped sensor region 128, a connector region 130, a tail region 132 extending between the sensor region 128 and the connector region 130, an electrically conductive circuitry 124, and a plurality of connection points 134 provided on a substrate 126. In this embodiment, at least a portion of the electrically conductive circuitry 124 may be arranged on the proximal side of the substrate 126 while another portion of the electrically conductive circuitry 124 may be arrange on the distal side of the substrate 126. In such an embodiment, the portion of the electrically conductive circuitry 124 arranged on the distal side of the substrate 126 may be electrically insulated from the proximal side of the sensor layer 114 by the substrate 126, such that a masking element may not be necessary on the proximal side of the sensor layer 114.

In an embodiment, the electrically conductive circuitry 124 may include a plurality of sensing electrodes 125 arranged on a proximal side of the sensor layer 114 (FIG. 4) and a plurality of connecting traces 127 arranged on a distal side of the sensor layer 114 (FIG. 5). The plurality of sensing electrodes 125 may be arranged adjacent and in contact with the adhesive layer 12 in the sensor region 128 of the sensor layer 114 and may be configured to detect a change of resistance in the adhesive layer 12. The plurality of connecting traces 127 may be configured to electrically connect the plurality of sensing electrodes 125 to the plurality of connection points 134 arranged in the connection region 130. By arranging the plurality of connecting traces 127, which are non-sensing portions of the electrically conductive circuitry 124, on the distal side of the sensor layer 114, a need for masking elements to electrically insulate the non-sensing portions for accurate leakage detection may be eliminated. In the embodiment of FIGS. 4 and 5, the connection points 134 are arranged on the proximal side of the substrate 126. In other embodiments, the connection points 134 may be arranged on the distal side of the substrate 126.

In some embodiments, the sensor layer 114 may include a plurality of vias 140, 142 configured to provide an electrical connection between the plurality of the sensing electrodes 125 and the plurality of connecting traces 127 and between the plurality of the connecting traces 127 and the plurality of connection points 134. The vias may be formed from a suitable electrically conductive material, such as copper. In such embodiments, each of the sensing electrodes 125, which is arranged on the proximal side of the substrate 126, may be electrically connected to at least one of the plurality of connecting trace 127 arranged on the distal side of the substrate 126 through a via 140 extending through the thickness of the substrate 126. Further, each of the plurality of connecting traces 127, which extends along the distal side of the substrate 126, may be electrically connected to at least one of the plurality of connection points 134 arranged on the proximal side of the substrate 126 through a via 142 that extends through the thickness of the substrate 126.

In the embodiment of FIGS. 4 and 5, the plurality of sensing electrodes 125 may comprise seven substantially circular electrodes, also referred to as "circular electrodes" herein, 125A, 125B, 125C, 125D, 125E, 125F, 125G, and four arc shaped electrodes, also referred to as "electrode arcs" herein, 125H, 125I, 125J, 125K. Each of the circular electrodes 125A-G may be arranged at a different radial distance from a center opening 118 of the sensor layer 114 as shown in FIG. 4 and configured to determine a radial progress of ostomy effluent leakage. The four electrode arcs 125H, 125I, 125J, 125K may be arranged in different sections of the sensor region 128 and configured to determine a location of a leak in the sensor region 128. In this embodiment, a first electrode arc 125H may be arranged to extend along a first quadrant of the sensor region 128, a second electrode arc 125I may be arranged to extend along a second quadrant of the sensor region 128, a third electrode arc 125J may be arranged to extend along a third quadrant of the sensor region 128, and a fourth electrode arc 125K may be arranged to extend along a fourth quadrant of the sensor region 128, such that a change in electrical resistance measured by one of the four electrode arcs may be used to determine the location of a leakage. In other embodiments, the sensor layer 114 may include less than four electrode arcs or more than four electrode arcs, which may be arranged in different sections of the sensor region 128 and configured to determine a location of a leakage.

Each of the plurality of the sensing electrodes 125A-125K may be connected to at least one of the plurality of connecting traces 127 through a via 140. In the embodiment of FIGS. 4 and 5, a first circular electrode 125A may be connected to a first connecting trace 127A through a first via 140A, a second circular electrode 125B may be connected to a second connecting trace 127B through a second via 140B, a third circular electrode 125C may be connected to a third connecting trace 127C through a third via 140C, a fourth circular electrode 125D may be connected to a fourth connecting trace 127D/G through a fourth via 140D, a fifth circular electrode 125E may be connected to a fifth connecting trace 127E through a fifth via 140E, a sixth circular electrode 125F may be connected to a sixth connecting trace 127F through a sixth via 140F, and a seventh circular electrode 125G may be connected to the fourth connecting trace 127D/G through a seventh via 140G. In this embodiment, two sensing electrodes 125D and 125G are connected to a single connecting trace 127 D/G. In some embodiments, more than two sensing electrodes may be connected to a single connecting trace.

As shown in FIG. 4, the first electrode arc 125H may be arranged in the first quadrant or an upper left quadrant of the sensor region 128 (when viewed from the proximal side) to detect a leakage in the first quadrant. The first electrode arc 125H may be connected to a seventh connecting trace 127H through an eighth via 140H. The seventh connecting trace 127H may extend along a fourth quadrant or a lower left quadrant of the sensor region 128 (when viewed from the proximal side) on the distal side and along the tail region 132 to electrically connect the first electrode arc 125H to a connection point 134H. The second electrode arc 125I may be arranged in the second quadrant or an upper right quadrant of the sensor region 128 (when viewed from the proximal side) to detect a leakage in the second quadrant. The second electrode arc 125I may be connected to an eighth connecting trace 127I through a ninth via 140I. The eighth connecting trace 127I may extend along a third quadrant or a lower right quadrant of the sensor region 128 (when viewed from the proximal side) on the distal side and along the tail region 132 to electrically connect the second electrode arc 125I to a connection point 134I. The third electrode arc 125J may be arranged in the third quadrant or a lower right quadrant of the sensor region 128 (when viewed from the proximal side) to detect a leakage in the third quadrant. The third electrode arc 125J may be connected to ninth connecting trace 127J through a tenth via 140J. The fourth electrode arc 125K may be arranged in the fourth quadrant or a lower left quadrant of the sensor region 128 (when viewed from the proximal side) to detect a leakage in the fourth quadrant. The fourth electrode arc 125K may be connected to tenth connecting trace 127K through a $11^{th}$ via 140K.

The ten connecting traces 127A-K, which are electrically connected to the eleven sensing electrodes 125A-K, may extend from the sensor region 128 along the tail region 132 to the connector region 130 on the distal side of the substrate 126. The connecting traces 127A-K may be electrically connected to the connection points 134A-K through the plurality of vias 142A-K. In the embodiment of FIGS. 4 and 5, the first connecting trace 127A may be connected to a first connection point 134A through a $12^{th}$ via 142A, the second connecting trace 127B may be connected to a second connection point 134B through a $13^{th}$ via 142B, the third connecting trace 127C may be connected to a third connection point 134C through a $14^{th}$ via 142C, the fourth connecting trace 127D/G may be connected to a fourth connection point 134D/G through a $15^{th}$ via 142D/G, the fifth connecting trace 127E may be connected to a fifth connection point 134E through a $16^{th}$ via 142E, the sixth connecting trace 127F may be connected to a sixth connection point 134F through a $17^{th}$ via 142F, the seventh connecting trace 127H may be connected to a seventh connection point 134H through a $18^{th}$ via 142H, the eighth connecting trace 127I may be connected to an eighth connection point 134I through a $19^{th}$ via 142I, the ninth connecting trace 127J may be connected to a ninth connection point 134J through a $20^{th}$ via 142J, and the tenth connecting trace 127K may be connected to a tenth connection point 134K through a $21^{th}$ via 142K. In this embodiment, the sensor layer 114 may comprise eleven sensing electrodes 125 electrically connected to ten connection points 134 though ten connecting traces 127 and twenty-one vias 140, 142.

In the embodiment of FIGS. 4 and 5, only the sensing electrodes 125 configured to measure resistance may be exposed on the proximal side of the double-sided sensor layer 114, while the connecting traces 127 may be arranged away from the proximal side, for example, on the distal side or between substrates. As such, a masking element for preventing shorting between electrodes or traces may not be necessary on the proximal side of the sensor layer 114. In an embodiment, at least a portion of the sensor layer 114 may be covered with a masking element on the distal side.

The substrate 126 may be formed from a suitable flexible polymeric material, such as a polyimide film. The substrates 126 may have a thickness of about 0.5 mil to about 3 mil, preferably, about 1 mil to about 2 mil, and more preferably about 1.5 mil. In an embodiment, the substrate 126 may be formed from a coverlay film having a thickness of about 1.3 mil and comprising a polyimide film coated with an acrylic adhesive on one side, such as PYRALUX® FR7013 available from Dupont. In some embodiments, the substrate 126 may comprise two or more layers, wherein the connecting traces 127 may be arranged between the substrate layers.

FIG. 6 shows the control unit 50 according to an embodiment. The control unit 50 may be selectively and removably and electrically connected to the sensor accessory 10 as shown in FIG. 7. For example, the control unit 50 may include a plurality of electrical connectors 54 configured to interface with the plurality of connection points 134. The control unit 50 may be removably connected to the plurality of connection points 134 by a known, suitable mechanical fastener, such as a spring-load clip, mechanical interlock, clamp, interference fit, and the like, including combinations thereof.

The control unit 50, for example via a controller, may be configured to provide an electrical current to the electrically conductive circuitry 124 and detect a change in electrical resistance measured by the sensing electrodes 125. For example, leakage of stomal effluent progressing from the center opening 18 outward into or along the adhesive layer 12 may cause electrical resistance between a pair of sensing electrodes 125 to decrease. The control unit 50 may detect the decrease in electrical resistance and determine that a leak is occurring based on the decreased electrical resistance. In an embodiment, the control unit 50, via the controller, may be configured to determine a location of the leak based on the location of the sensing electrodes 125 that detected the change in resistance. The control unit 50 may be further configured to provide a notification or alert indicating that a leak has been detected and/or a location of the leak. The notification or alert may be, for example, an audible, visible, or haptic alert, or a combination thereof. The control unit 50 may also be configured for wired and/or wireless communication with other electronic devices, such as a smart phone and the like. In an embodiment, the control unit 50 may be paired, synced, or otherwise communicatively connected to the personal notification device with a known pairing or syncing operation, which may be initiated, for example, by operation of a switch.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular. In additions, various features described with respect to any of the embodiments above may be used together, implemented in, or replace features in any of the other embodiments described above.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A sensor device for an ostomy appliance comprising:
   a sensor layer comprising:
   a substrate;
   a plurality of sensing electrodes arranged on a proximal side of the substrate;
   a plurality of connecting traces arranged on a distal side of the substrate, wherein the plurality of connecting traces are insulated by the substrate from the proximal side of the substrate, wherein the plurality of sensing electrodes are electrically connected to the plurality of connecting traces through a plurality of vias; and
   a plurality of connection points configured to electrically connect the sensor device to a control unit, wherein the plurality of sensing electrodes are electrically connected to the plurality of connection points by the plurality of connecting traces; and
   a skin barrier layer arranged adjacent the plurality of sensing electrodes for attaching the sensor device to a user;
   wherein the sensor device is configured to detect an ostomy effluent leakage.

2. The sensor device of claim 1, wherein the sensor layer includes a generally ring-shaped sensor region, a connector region, and a tail region connecting the sensor region and the connector region, wherein the plurality of sensing electrodes are arranged in the sensor region and the plurality of connection points are arranged in the connector region.

3. The sensor device of claim 1, wherein the plurality of connection points are arranged on the proximal side of the substrate, wherein each of the plurality of connecting traces is electrically connected to at least one of the plurality of connection points through the plurality of vias.

4. The sensor device of claim 1, wherein the plurality of vias are formed from an electrically conductive material and extend through a thickness of the substrate.

5. The sensor device of claim 1, wherein the plurality of sensing electrodes comprise a first sensing electrode, a second sensing electrode, and a third sensing electrode, wherein the plurality of connecting traces comprise a first connecting trace, a second connecting trace, and a third connecting trace, and wherein the plurality of connection points comprise a first connection point, a second connection point, and a third connection point.

6. The sensor device of claim 5, wherein the first sensing electrode is electrically connected to the first connecting trace through a first via, the second sensing electrode is electrically connected to the second connecting trace through a second via, and the third sensing electrode is electrically connected to the third connecting trace through a third via, wherein the first connecting trace is electrically connected to the first connection point through a fourth via, the second connecting trace is electrically connected to the second connection point through a fifth via, and the third connecting trace is electrically connected to the third connection point through a sixth via.

7. The sensor device of claim 5, wherein the first sensing electrode is electrically connected to the first connecting trace through a first via, the second sensing electrode is electrically connected to the second connecting trace through a second via, the third sensing electrode is electrically connected to the second connecting trace through a third via, wherein the first connecting trace is electrically connected to the first connection point through a fourth via and the second connecting trace is electrically connected to the second connection point through a fifth via.

8. The sensor device of claim 5, wherein the first, second, and third sensing electrodes are substantially circular electrodes, wherein each of the first, second, and third sensing electrodes is arranged at a different radial distance from a center opening of the sensor device, wherein the first, second, and third sensing electrodes are configured to determine a radial distance of an ostomy effluent leakage location.

9. The sensor device of claim 5, wherein the first, second, and third sensing electrodes are arc shaped electrodes, wherein each of the first, second, and third sensing electrodes is arranged in a different section of the sensor region, wherein the first, second, and third sensing electrodes are configured to determine a location of ostomy effluent leakage.

10. The sensor device of claim 9, wherein the plurality of sensing electrodes further comprise a fourth sensing electrode having an arc shape, wherein the first sensing electrode is arranged in a first quadrant of the sensor region, the second sensing electrode is arranged in a second quadrant of the sensor region, the third sensing electrode is arranged in a third quadrant of the sensor region, and the fourth sensing electrode is arranged in a fourth quadrant of the sensor region, wherein the sensor device is configured to determine a location of ostomy effluent leakage based on a location of a sensing electrode that detected a change in an electrical resistance.

11. The sensor device of claim 10, wherein the plurality of connecting traces further includes a fourth connecting trace, wherein the first sensing electrode arranged on the proximal side of the substrate in the first quadrant of the sensor region is electrically connected to the first connecting trace through a first via, the first connecting trace extending along the fourth quadrant of the sensor region and along the tail region on the distal side of the substrate, wherein the second sensing electrode arranged on the proximal side of the substrate in the second quadrant of the sensor region is electrically connected to the second connecting trace through a second via, the second connecting trace extending along the third quadrant of the sensor region and along the tail region on the distal side of the substrate, wherein the third sensing electrode arranged on the proximal side of the substrate in the third quadrant of the sensor region is electrically connected to the third connecting trace through a third via, the third connecting trace extending from a lower portion of the sensor region and along the tail region on the distal side of the substrate, and wherein the fourth sensing electrode arranged on the proximal side of the substrate in the fourth quadrant of the sensor region is electrically connected to the fourth connecting trace through a fourth via, the fourth connecting trace extending from a lower portion of the sensor region and along the tail region on the distal side of the substrate.

12. The sensor device of claim 11, wherein the plurality of connection points are arranged on the proximal side of the substrate and further comprise a fourth connection point, wherein the first connecting trace is electrically connected to the first connection point via a fifth via, the second connecting trace is electrically connected to the second connection point via a sixth via, the third connecting trace is electrically connected to the third connection point via a seventh via, and the fourth connecting trace is electrically connected to the fourth connection point via an eighth via.

13. The sensor device of claim 1, wherein the sensor device is configured to detect an ostomy effluent leakage based a change in electrical resistance measured by the plurality of sensing electrodes.

14. The sensor device of claim 1, the plurality of connection points are configured to interface with a plurality of electrical connectors on the control unit to electrically connect the sensor device to the control unit.

15. The sensor device of claim 1, wherein at least one of the plurality of sensing electrodes are provided an electrical current from the control unit to detect a change in electrical resistance measured by the plurality of sensing electrodes.

16. The sensor device of claim 1, wherein the control unit is configured as a wearable device that can removably connect to the sensor device.

17. The sensor device of claim 1, wherein the plurality of connecting traces are electrically insulated from the skin barrier layer by the substrate.

18. The sensor device of claim 2, wherein the plurality of connecting traces are positioned within the tail region.

* * * * *